United States Patent
Simon

(10) Patent No.: US 7,881,498 B2
(45) Date of Patent: Feb. 1, 2011

(54) AUTONOMOUS WIDE-ANGLE LICENSE PLATE RECOGNITION

(76) Inventor: James Simon, 8 Estates Dr., Villa Park, CA (US) 92861

( * ) Notice: Subject to any disclaimer, the term of this patent is extended or adjusted under 35 U.S.C. 154(b) by 0 days.

(21) Appl. No.: 12/757,262

(22) Filed: Apr. 9, 2010

(65) Prior Publication Data

US 2010/0195871 A1    Aug. 5, 2010

Related U.S. Application Data

(63) Continuation of application No. 10/546,555, filed as application No. PCT/US03/21958 on Jul. 10, 2003, now Pat. No. 7,711,150.

(51) Int. Cl.
*G06K 9/00*    (2006.01)
(52) U.S. Cl. .................................... 382/105
(58) Field of Classification Search ................. 382/100, 382/104, 105, 181, 182, 183, 318, 321; 340/425.5, 340/426.1, 932.2, 933, 936, 969; 348/113–115
See application file for complete search history.

(56) References Cited

U.S. PATENT DOCUMENTS

| | | | |
|---|---|---|---|
| 5,381,155 | A | 1/1995 | Gerber |
| 5,793,420 | A | 8/1998 | Schmidt |
| 6,476,730 | B2 | 11/2002 | Kakinami et al. |
| 2002/0080013 | A1 | 6/2002 | Anderson et al. |
| 2002/0186297 | A1 | 12/2002 | Bakewell |
| 2004/0201460 | A1 | 10/2004 | Bucholz et al. |

*Primary Examiner*—Samir A Ahmed
*Assistant Examiner*—Atiba O Fitzpatrick
(74) *Attorney, Agent, or Firm*—Fish & Associates, PC

(57) ABSTRACT

A system in a moving surveillance vehicle operates in background mode to capture images of license plates of neighboring moving vehicles, which may occupy lanes other than the lane in which the surveillance vehicle is moving. The images are used to determine the license plate numbers of the moving vehicles, which are then checked against a database to determine whether there are any potential law enforcement-related problems that require the attention of the operator. If so, the system alerts the operator using an audible tone, visual prompt, vibration, or in some other suitable manner. The entire process, including generation of the alert can occur autonomously of the operator.

11 Claims, 2 Drawing Sheets

AUTONOMOUS WIDE-ANGLE LICENSE PLATE RECOGNITION

This application is a continuation of U.S. patent application Ser. No. 10/546,555 filed Aug. 22, 2005 which is a U.S. National Phase of PCT/US03/21958 filed Jul. 10, 2003. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The present invention relates generally to license plate recognition.

BACKGROUND OF THE INVENTION

Traffic police, highway patrol and other mobile security personnel have a need to accurately and efficiently identify potential law enforcement problems with respect to nearby motor vehicles. One well-recognized strategy is to "run" license plate numbers of such vehicles against a database.

It is a well known practice for an officer in a patrol car to visually read a license plate of a target vehicle, and then call in the number to a support center. It is also known for an officer to utilize an on-board digital video camera to capture an image of the vehicle license plate of a parked vehicle, and even to use an on-board computer to analyze the image to determine the license plate number. In both cases, however, conscious effort is required on the part of the officer, which diverts attention from driving or other activities. In some cases the diversion of attention can be dangerous, and can even contribute to an otherwise preventable car accident.

A highly advanced license plate recognition and checking system is described in Japanese patent 11-296785, published on Oct. 29, 1999, the disclosure of which is incorporated herein in its entirety by reference. In that system the patrol car is provided with an on-board camera and camera controller, optical character recognition (OCR) software, a database, and a display device. While moving along a road, the driver places the patrol car in front of or behind the target car, and then triggers operation of the camera. The camera photographs the license plate of a preceding or following target vehicle, and sends the captured image to the on-board computer. OCR software running on the computer determines the license plate number, and applies that number against the on-board database. The results are displayed to the operator.

Apparently, the inventors of Japanese patent 11-296785 did not appreciate that (a) forcing the driver of the patrol car to maneuver his vehicle relative to the target vehicle, and (b) forcing the operator to trigger the camera, involve conscious efforts on the part of the driver, which preclude the system from operating in a truly autonomous fashion. The issue of being fully autonomous is not a mere design choice. Fully autonomous operation is not only safer and more thorough, it also has a particularly important function in countering accusations of racial profiling. If a system could be devised that would autonomously process license plate information of all vehicles in view of the camera, including vehicles in other lanes, then the operator could not be reasonably accused of focusing on any particular car or driver.

Thus, there is still a need for more fully autonomous surveillance of moving automotive vehicles from another moving vehicle.

SUMMARY OF THE INVENTION

The present invention is generally directed to systems and methods in which a first moving vehicle (surveillance vehicle) captures vehicle license plate number information from a second moving vehicle in a fully autonomous fashion, and applies that information against a database to identify potential problems with the second vehicle or its driver. In preferred embodiments the surveillance vehicle is preferably a police car or other patrol unit; and the second vehicles can be in any lane that is visible from the camera, including the same lane as that occupied by the first vehicle, other driving lanes, and even in parking areas or road shoulders.

A digital video camera with a wide-angle lens is preferably used to capture the license place information. Alternatively, any other suitable image-capturing device could be used, including a still-image camera. The camera can advantageously be mounted on the front, rear, side or top of the surveillance vehicle, and preferably has a viewing angle range of at least 120°.

An on-board processor can either (a) perform optical character recognition on an acquired image to determine the license plate number, or (b) transmit at least a portion of the image to a remote site for that determination. The license plate number can then be applied against one or more databases, which can be local and/or remote to the camera and processor, to identify potential problems with the car or driver of the second vehicle.

Ideally, each of these functions is carried out continuously, in background mode without any input from the driver or other operator of the vehicle carrying the system. When potential problems are identified, the operator is notified using an auditory, visual or other alert.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
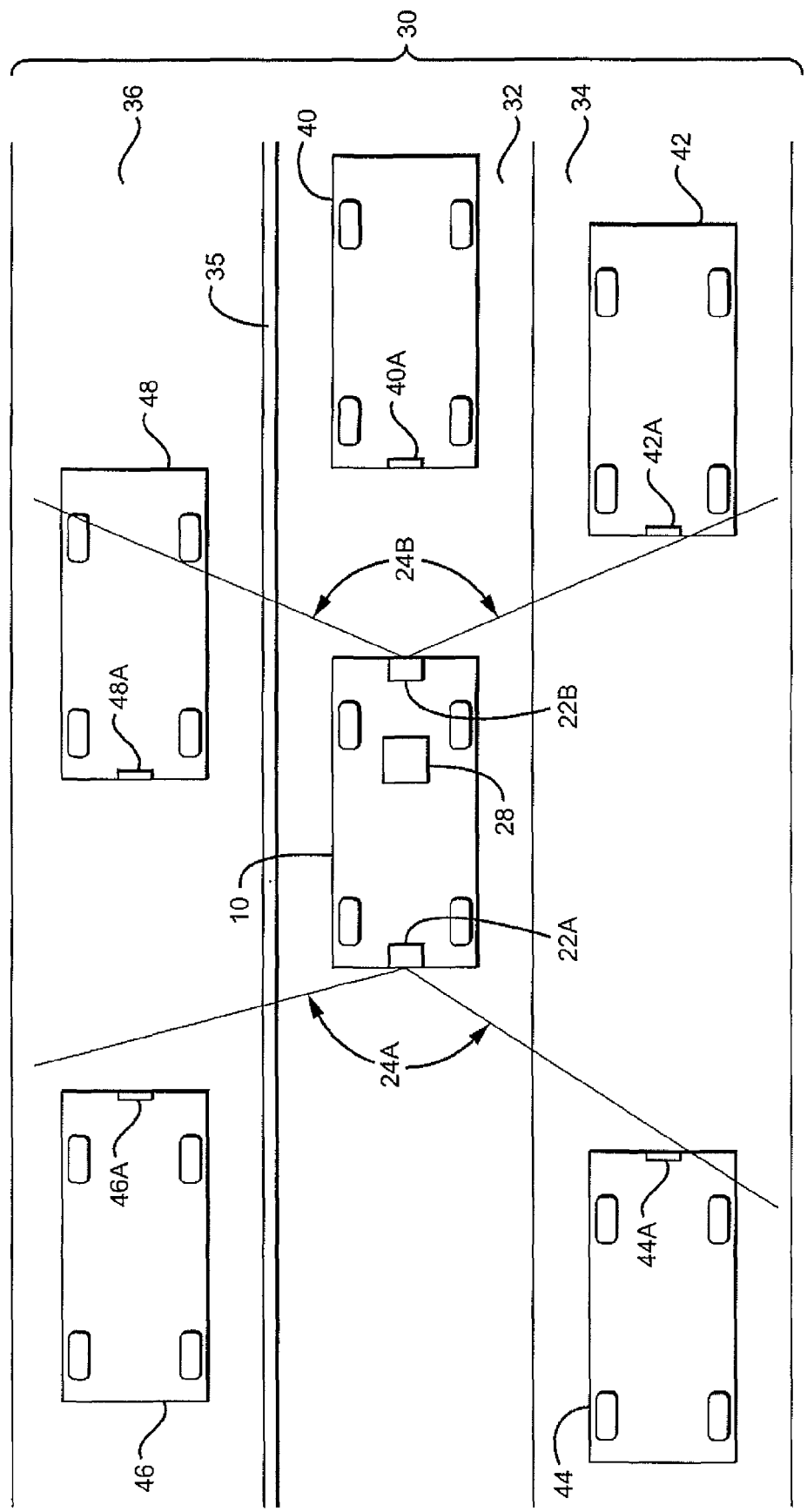
FIG. 1 is a side perspective view of a moving surveillance vehicle carrying a surveillance system according to the inventive subject matter, with neighboring vehicles in various lanes.

FIG. 1 generally depicts a surveillance vehicle 10 equipped with a surveillance system 20 (see FIG. 2) that is driving along a roadway 30 in lane 32. Another vehicle 40 is traveling ahead of surveillance vehicle 10 in lane 32, while vehicles 42, 44 are traveling in the same direction as surveillance vehicle 10 in lane 34. Vehicles 46 and 48 are traveling in the oncoming direction in lane 36, across low median 35. Surveillance system 20 generally comprises first and second digital video cameras 22A, 22B, a processor 26 (see FIG. 2), and an alert generator (see FIG. 2, 28A-28C).

The surveillance vehicle 10 will often be a patrol car, but can be any road or off-road vehicle, including jeeps, trucks, ambulances, buses, recreational vehicles, fire engines, and so forth. The neighboring vehicles 40, 42, 44, 46 and 48 can likewise be any combination of any types of vehicles, and will obviously be dispersed around the surveillance vehicle 10 in a manner that varies infinitely over time. Most of the neighboring vehicles 40, 42, 44, 46 and 48 will have rear license plates, and some can have front license plates. In this drawing, the relevant license plates for vehicles 40, 42, 44, 46 and 48 are 40A, 42A, 44A, 46A, and 48A, respectively.

Cameras 22A, 22B are mounted at the front and rear portions of surveillance vehicle 10. Mounting can be on the bumpers or anywhere else, and can even be located in other positions such as in the siren tower on top of the surveillance vehicle 10 or inside the cab behind the windshield. One or both of cameras 22A, 22B can be mounted in the center line of the surveillance vehicle 10, or off-center in any suitable manner. There must of course be at least one camera, which could provide front, rear, side or combination coverage. Second, third, and other cameras are optional. A person skilled in the art should recognize that more than two cameras could be mounted on surveillance vehicle 10 in suitable locations (e.g., front, rear, side or top of vehicle) to allow up to 360° license plate scan coverage.

Each camera 22A, 22B has a lens (not shown) that "sees" license plates within their respective viewing angles 24A, 24B. A wide-angle lens (not shown) is optional, and where present would preferably be a high-precision spherical lens adapted to minimize distortion and other aberrations for sharp and high-contrast images with a viewing angle range of about 75°-150°. Preferred viewing angles are at least 90°, more preferably at least 120°, still more preferably at least 150°, and most preferably at least 160°. Viewing angles 24A, 24B are shown as being pointed directly forward and aft of surveillance vehicle 10, but can alternatively be pointed in other directions as well. The viewing direction can optionally be motorized to scan a swath of area up, down, and sideways, or to point in a particular direction, and those functions can be automated and/or manual. As drawn, forward camera 22B can "see" license plates 40A, and 42A, but not license plate 48A. Rearward camera 22A can "see" license plate 44A, and license plate 46A.

In FIG. 1 cameras 22A, 22B are ordinary video cameras. Other types of cameras can be used, including still cameras, charge-coupled device cameras for higher resolution, infrared cameras for night operations, and so forth. The focus is most likely set to infinite, but there can also be an automatic focusing mechanism (not shown). One or both of cameras 20, 22 can be advantageously provided with illumination, which can be in the form of a controlled light source (not shown) adapted to brighten vehicle license plates during the day and/or allow camera operation during the night. Alternatively, the illumination means can be an infra-red (IR) light source, i.e. invisible to the driver of the neighboring vehicles.

Figure 2:
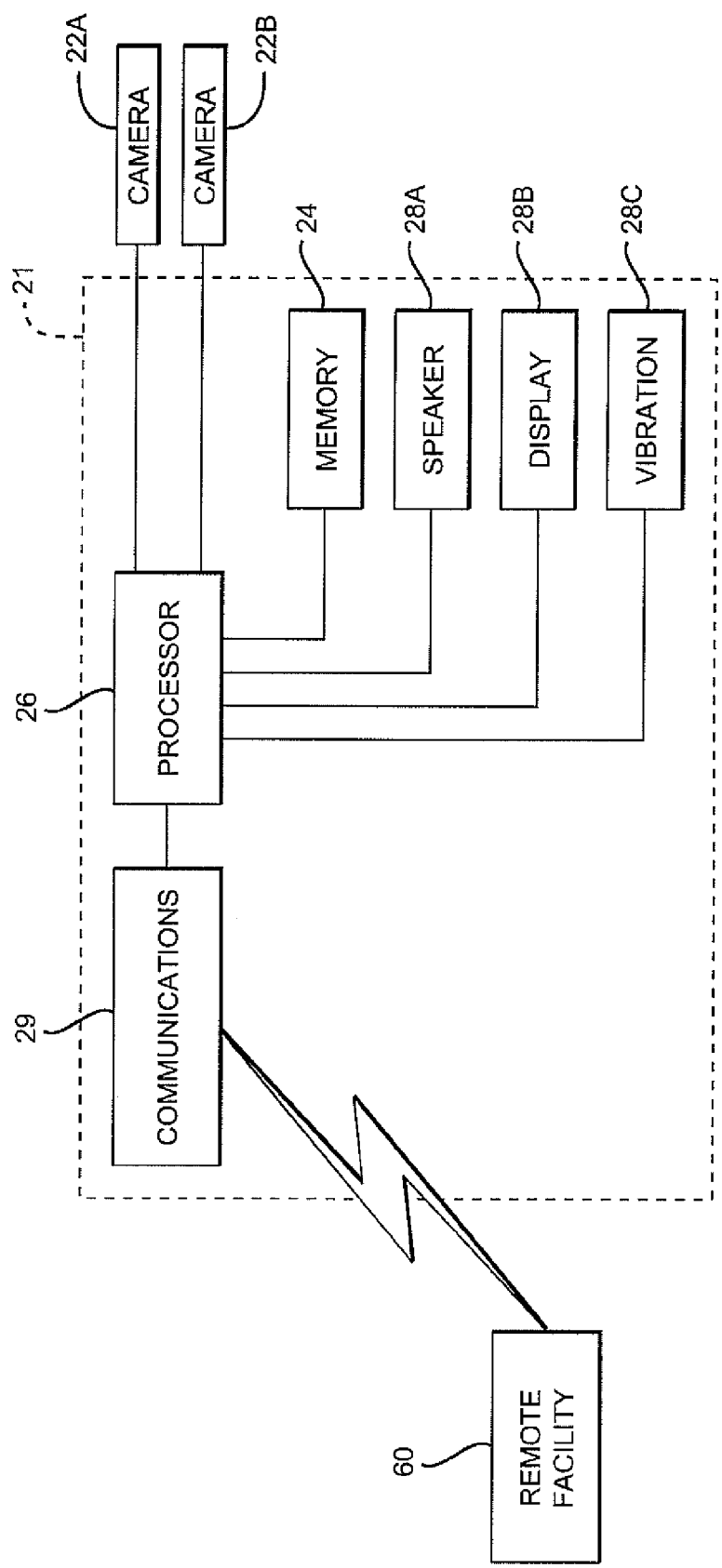
FIG. 2 is a schematic representation of the surveillance system of FIG. 1.

In FIG. 2 surveillance system 20 generally comprises first and second digital video cameras 22A, 22B, a processor 26, memory 24, and an alert generator (see FIG. 2, 28A-28C).

Processor 26 can be any suitable processor, including for example CPU(s) (central processing unit(s)) made by Intel Corp. (e.g., Pentium®, Xeon®), AMD (e.g., Athlon®), Motorola, IBM, etc., I/O (input/output) circuits, communication bus links, etc. Processor 26 receives digital image data input from cameras 22A, 22B, and processes the data software resident in memory 24. The software preferably includes an operating system (OS) (e.g., Windows®, Linux®, Unix®, Free BSD®, etc.), and optical character recognition programs.

Memory 24 can also advantageously include county-wide, state-wide, nation-wide, or even multi-country vehicle license plate number data, as well as related information of interest such as law enforcement-related data. Information that is not available on-board the surveillance vehicle 10 can be accessed wirelessly from a remote facility 60. In that case system 20 would need to be adapted for wireless connection using communication hardware 29.

Optical character recognition preferably occurs on board vehicle 10, but may alternatively or additionally occur in the remote facility 60, or elsewhere. Any suitable OCR software can be used, such as that of Hi-Tech Solutions, currently available through www.htsol.com. Many suitable OCR algorithms operate in three stages. The first stage involves vectorizing the captured (raster) image. The second stage deals with isolation of the vectors that describe the raster image. The third stage performs the subsequent alphanumeric character recognition to generate a plate string. More details on suitable theory, methods and algorithms can be found on the World-Wide-Web at: http://www.cae.wisc.edu/~woochull/course/lpr.html; http://www.cs.technion.ac.il/Labs/Isl/Project/Projects_done/cars_plates/finalreport.htm; http://www.singaporegateway.com/optasia/imps, or in numerous literature sources such as, for example, "Computer Graphics: Principles and Practice", Foley, van Dam, Flener, and Hughes, Addison Wesley, Reading, Mass., 1990; which are incorporated herein by reference.

To lower cost, the processor 26, memory 24, and communication hardware 29 would generally be included as part of a laptop or other computer (shown generally as component 21) that had already been installed in vehicle 10 for other purposes. Alternatively, processor 26, memory 24, display 28B, and speaker 28A can be implemented as an integral part of cameras 22A, 22B.

The network used to communicate with remote facility 60 could be the same network already being used by computer 21, or could be some other network. Transmission of license plate data between processor 24 and remote facility 60 can be encrypted using any suitable data encryption algorithms to ensure data security.

Processor 26 cooperates with one or more alert devices, such as speaker 28A, computer display 28B, or vibratory interface 28C. Alternatively, processor 26 can utilize any other speaker (not shown) in the vehicle 10.

The entire system 20 is preferably programmed to operate autonomously in background mode, i.e., without any input being required from the operator. The operator is preferably only alerted where the system 20 has identified a possible law enforcement-related problem using the captured license plate information. System 20 can be designed to operate continuously for an extended period of time while vehicle 10 is patrolling the streets/highways, and can be turned on and off by the operator as desired.

Multiple instances of system 20 can be installed and operated on multiple surveillance vehicles for more efficient license plate number check coverage, and the various systems may cooperate with each other by exchanging information. System 20 can also be operated in conjunction with global satellite or other positioning systems (not shown). Thus, for example, one squad car may identify a neighboring vehicle at a given location, and another squad car may identify the same vehicle 30 minutes later at another location. By calculating the distance traveled by the targeted vehicle, the system could calculate the minimum speed that the target vehicle traveled during that time frame. The vehicle license data gathered by system 20 during routine surveillance patrols could also be used for other than law enforcement purposes, as needed and/or authorized by local law regulations.

A contemplated method includes the following steps: The processor 26 activates one or more cameras 22A, 22B, which capture images of nearby vehicle license plates. The captured information is read by a frame grabber in each camera. Pixel output from the frame grabber(s) is passed by the processor 26 through image processing software algorithms to enhance the image, if necessary, detect the vehicle license plate position, and through OCR software algorithms determine a license plate number. The processor then checks the license plate number against corresponding data records stored in memory 24, or in remote license plate number facility 60, for potential law enforcement-related vehicle problems. If a problem is identified, the operator (not shown) is alerted audibly, visually or in a vibratory manner using one or more of speaker 28A, computer display 28B, or vibratory interface 28C, respectively.

While the present invention has been described in detail with regards to the preferred embodiments, it should be appreciated that various modifications and variations can be made in the present invention without departing from the scope or spirit of the invention. In this regard it is important to note that practicing the invention is not limited to the applications described hereinabove. Many other applications and/or alterations can be utilized provided that such other applications and/or alterations do not depart from the intended purpose of the present invention. Also, features illustrated or described as part of one embodiment can be used in another embodiment to provide yet another embodiment such that the features are not limited to the specific embodiments described above. Thus, it is intended that the present invention cover all such embodiments and variations as long as such embodiments and variations come within the scope of the appended claims and their equivalents.

What is claimed is:

1. A method of surveilling multiple target vehicles from a surveillance vehicle, comprising:

providing or operating the surveillance vehicle with a camera system disposed to capture license plate information on each of the target vehicles regardless of whether the target vehicles are in a same lane as the surveillance vehicle, or in left or right adjacent lanes to that of the surveillance vehicle, while the surveillance vehicle and the target vehicles are all moving; and providing or operating the surveillance vehicle with a computer programmed to use the license plate information to determine license plate numbers for each of the target vehicles, and alert an operator of the surveillance vehicle only upon discovering that there is a potential problem related to one of the target vehicles, all without a need for input from the operator.

2. The method of claim 1, wherein a first one of the target vehicles is traveling in the same lane as the surveillance vehicle, and concurrently a second one of the target vehicles is traveling in the left lane adjacent to that of the surveillance vehicle, and concurrently a third one of the target vehicles is traveling in the right lane adjacent to that of the surveillance vehicle.

3. The method of claim 2, wherein the computer is further programmed to discover the potential problem at least in part by comparing the license plate numbers to data in a database.

4. The method of claim 3, further comprising the computer accessing the database from a source local to the surveillance vehicle.

5. The method of claim 3, further comprising the computer accessing the database from a source distal to the surveillance vehicle.

6. The method of claim 2, wherein the camera system comprises a first camera mounted at a front portion of the surveillance vehicle, and a second camera is mounted at a rear portion of the surveillance vehicle.

7. The method of claim 2, further comprising alerting the operator of the surveillance vehicle of the potential problem while the surveillance vehicle is traveling at a speed at least 50 kilometers per hour.

8. The method of claim 2, further comprising transmitting at least a portion of at least one image captured by the camera system to a remote facility for license plate recognition.

9. The method of claim 2, further comprising, transmitting at least one of the license plate numbers to a remote facility to determine the potential problem.

10. The method of claim 2, further comprising using a sound to alert the operator of the existence of the potential problem.

11. The method of claim 2, further comprising using a non-auditory alert to apprise the operator of the existence of the potential problem.

* * * * *